United States Patent
Zhang et al.

(10) Patent No.: US 9,042,831 B2
(45) Date of Patent: May 26, 2015

(54) WIRELESS TRANSMISSION METHOD AND ASSOCIATED SYSTEM

(75) Inventors: John Zhongxuan Zhang, ChunPei, Hsinchu County (TW); Chih-Cheng Ku, ChuPei, Hsinchu County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 785 days.

(21) Appl. No.: 13/236,988

(22) Filed: Sep. 20, 2011

(65) Prior Publication Data

US 2013/0005268 A1 Jan. 3, 2013

(30) Foreign Application Priority Data

Jun. 28, 2011 (TW) .............................. 100122645 A

(51) Int. Cl.
| | |
|---|---|
| H04B 15/00 | (2006.01) |
| H04B 17/00 | (2006.01) |
| H04W 72/08 | (2009.01) |
| H04W 76/02 | (2009.01) |

(52) U.S. Cl.
CPC .......... *H04W 72/082* (2013.01); *H04W 76/023* (2013.01)

(58) Field of Classification Search
CPC .......................... H04W 72/082; H04W 76/023
USPC ............... 455/62, 67.11, 77, 450, 454, 553.1; 370/329, 332; 375/344
See application file for complete search history.

(56) References Cited

U.S. PATENT DOCUMENTS

| | | | | |
|---|---|---|---|---|
| 5,870,666 | A | * | 2/1999 | Tanaka et al. ............... 455/67.11 |
| 6,195,554 | B1 | * | 2/2001 | H'mimy et al. ............... 455/450 |
| 2004/0081081 | A1 | * | 4/2004 | Colombo ....................... 370/216 |
| 2010/0297958 | A1 | * | 11/2010 | Murakami et al. .............. 455/77 |
| 2012/0155403 | A1 | * | 6/2012 | Lee ................................ 370/329 |

FOREIGN PATENT DOCUMENTS

| | | |
|---|---|---|
| CN | 101895310 A | 11/2010 |
| TW | 200704007 A | 1/2007 |
| TW | 201019748 A | 5/2010 |

OTHER PUBLICATIONS

Taiwan Office Action dated Aug. 22, 2014, 5 pages.

* cited by examiner

*Primary Examiner* — Ankur Jain
(74) *Attorney, Agent, or Firm* — Edell, Shapiro & Finnan, LLC

(57) ABSTRACT

A method of wireless transmission applicable to transmission between a first communication terminal and a second transmission terminal is provided. The first communication terminal transmits data via a first channel selected as a primary transmission channel. The transmission quality of the primary transmission channel is detected. When it is determined that the quality of the primary transmission channel degrades, a third channel replaces the first channel as the primary transmission channel, and a replacement request is sent from the first communication terminal via a second channel. The first communication channel then transmits data via the third channel as the primary transmission channel.

16 Claims, 4 Drawing Sheets

WIRELESS TRANSMISSION METHOD AND ASSOCIATED SYSTEM

This application claims the benefit of Taiwan application Serial No. 100122645, filed Jun. 28, 2011, the subject matter of which is incorporated herein by reference.

BACKGROUND OF THE INVENTION

1. Field of the Invention

The invention relates in general to a wireless transmission system, and more particularly, to a wireless transmission technique for enhancing flexibilities of frequency hopping.

2. Description of the Related Art

Countries around the globe provide specific open-source wireless communication bands to the public for free use. In some currently prevailing short-distance communication standards such as Bluetooth and ZigBee, data is transmitted via a 2.4 GHz open-source Industrial, Scientific and Medical (ISM) band.

In addition, in order to optimize consumer convenience as well as simplify physical wiring for both household and commercial electronic products, nowadays, the short-distance wireless transmission function via the above open-source band has become more widely adopted in electronic devices. However, due to the significant growth of products and users using the open-source bands, interference between multiple signals within a same band also becomes inevitable.

A frequency hopping technique is proposed to overcome the above issue. A conventional frequency hopping approach first determines frequency hopping rules including a fixed interval and a fixed sequence at two terminals of the wireless communication. The transmitting terminal and the receiving terminal then periodically and simultaneously switch a data transmission channel thereof to another, so as to prevent using a same predetermined channel. However, supposing a continuous interference is present at the pre-selected channel or channels, the overall signal transmission quality is nevertheless undesirably affected even when the current frequency hopping technique is utilized.

SUMMARY OF THE INVENTION

The invention is directed to a wireless transmission method of and a wireless transmission system applying the method. By two cooperating wireless communication channels, the method and system of the present invention, supporting a smart frequency hopping function, provides enhanced transmission quality to realize seamless data transmission.

According to an embodiment of the present invention, a wireless transmission method applied between a first communication terminal and a second communication terminal is provided. The method comprises: the first communication terminal selecting a first channel as a primary transmission channel and transmitting data from the first communication terminal via the first channel to the second transmission terminal; detecting a communication quality of the primary transmission channel, replacing the first channel with a third channel as the primary transmission channel when a quality degradation is detected in the primary transmission channel, and the first communication terminal sending a replacement request via a second channel; and the first communication terminal continuing transmitting data via the third channel as the primary transmission channel.

According to another embodiment the present invention, a wireless communication system comprising a first communication terminal and a second communication terminal is provided. The first communication terminal comprises a first primary transmission circuit and a first secondary transmission circuit. The second communication terminal comprises a second primary transmission circuit corresponding to the first primary transmission device, and a second secondary transmission circuit corresponding to the first secondary transmission circuit. The first primary transmission circuit utilizes a first channel as a primary transmission channel, and transmits data to the second primary transmission circuit. When a quality degradation is determined to be present in the primary transmission channel, the first secondary transmission circuit sends a replacement request via a second channel to the second secondary transmission circuit, so as to notify the second communication terminal to replace the first channel with a third channel as the primary transmission channel for continuing the data transmission.

The above and other aspects of the invention will become better understood with regard to the following detailed description of the preferred but non-limiting embodiments. The following description is made with reference to the accompanying drawings.

DETAILED DESCRIPTION OF THE INVENTION

According to an embodiment of the present invention, a wireless transmission system including two communication terminals is provided. For example, in an active three-dimensional (3D) image display system alternately displaying a left-eye image and a right-eye image on a monitor, it is necessary to build a wireless communication mechanism between a display and a pair of 3D glasses worn by a viewer, for allowing synchronous switching of the images on the display and transparency of the pair of 3D glasses. The wireless communication method is applicable between a 3D image display and a pair of corresponding 3D glasses, but not limited hereto.

Figure 1:
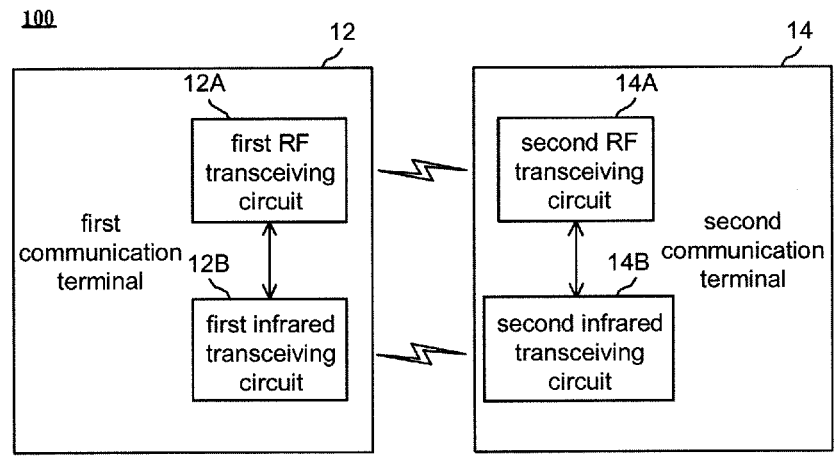
FIG. 1 is a block diagram of a wireless transmission system according to an embodiment of the present invention.

As shown in FIG. 1, a wireless communication system 100 according to an embodiment of the present invention comprises a first communication terminal 12 and a second communication terminal 14. The first communication terminal 12 comprises a first radio frequency (RF) transceiving circuit 12A and an infrared transceiving circuit 12B. The second communication terminal 14 comprises a second RF transceiving circuit 14A and a second infrared transceiving circuit 14B. It is to be noted that, between the first communication terminal 12 and the second communication terminal 14 may be other possible hardware devices that are not illustrated in the diagram. Furthermore, in the first communication terminal 12, the first RF transceiving circuit 12A serves as a first primary transmission apparatus and the first infrared transceiving circuit 12B serves as a first secondary transmission apparatus. Similarly, in the second communication terminal 14, the second RF transceiving circuit 14A serves as a second primary transmission apparatus and the second infrared transceiving circuit 14B serves as a second secondary transmission apparatus.

The first RF transceiving circuit 12A corresponds to the second RF transceiving circuit 14A; the first infrared transceiving circuit 12B corresponds to the second infrared transceiving circuit 14B. An example of Bluetooth compliant RF transceiving circuits as the first RF transceiving circuit 12A and the second RF transceiving circuit 14A, and corresponding infrared transceiving circuits as the first infrared transceiving circuit 12B and the second infrared transceiving circuit 14B, is to be illustrated below for illustrative purposes but not to limit the present invention hereto.

In this embodiment, the data transmission between the first communication terminal 12 and the second communication terminal 14 is mainly performed by the first RF transceiving circuit 12A and the second RF transceiving circuit 14A, which have primary roles in the transmission, and assisted by the first RF transceiving circuits 12B and the second RF transceiving circuits 14B, which have secondary roles in the transmission. In other embodiments, the above primary and secondary roles may be exchanged. That is, under certain circumstances, the first and second infrared transceiving circuits 12B and 14B may also be primarily responsible for the data transmission between the two communication terminals. In addition, the data transmission between the first communication terminal 12 and the second communication terminal 14 may be one-directional or bi-directional. In an example that the 3D image display is serving as the first communication terminal 12 and the corresponding 3D glasses is serving as the second communication terminal 14, data transmitted in the above data transmission may include left-eye images and right-eye images switching information transmitted from the 3D image display to the 3D glasses.

Figure 2:
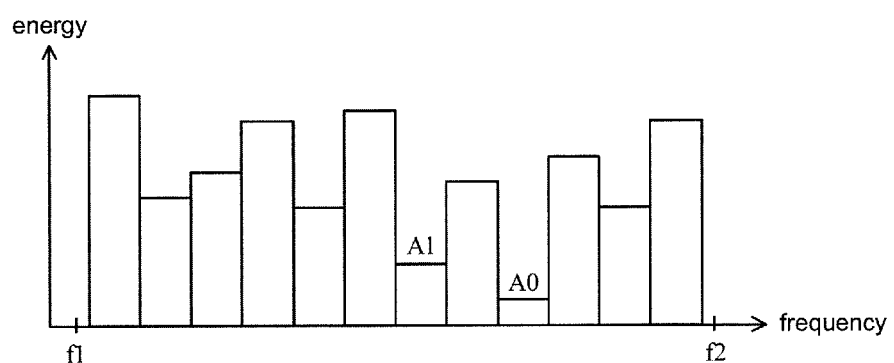
FIG. 2 is an example of an idle channel search result.

When a data transmission between the first communication terminal 12 and the second communication 14 begins, the first RF transceiving circuit 12A first performs an idle channel search to determine a primary transmission channel. FIG. 2 shows an example of a result of the idle channel search. In this example, a search range of the first RF transceiving circuit 12A is between frequencies f1 and f2, and a first channel A0 has the least interference energy. That is to say, between the frequencies f1 and f2, a utilization rate of the first channel A0 is the lowest or has the least interference. Therefore, the first RF transceiving circuit 12A selects the first channel A0 as the primary transmission channel, and transmits an inquiry packet via the primary transmission channel A0.

In contrast, the second RF transceiving circuit 14A in the second communication terminal 14 performs a packet channel scan to confirm which channel is the primary transmission channel by identifying the channel where the foregoing inquiry packet is transmitted. Upon perceiving the first channel A0 serving as the primary transmission channel, the second RF transceiving circuit 14A transmits a confirmation packet via the first channel A0 to inform the first communication terminal 12 of the presence of the second communication terminal 14, and to confirm that the second communication terminal 14 is ready to transceive data via the first channel A0. When the confirmation packet is received, the first RF transceiving circuit 12A then starts the data transmission between the first channel/primary transmission channel A0 and the second RF transceiving circuit 14A.

In this embodiment, when performing the idle channel search for determining the primary transmission channel A0, the first RF transceiving circuit 12A may also determine a reserve primary transmission channel for reserving to replace the first channel A0 as the primary transmission channel in the future. Referring to FIG. 2, when selecting the first channel A0 during the idle channel search, the first RF transceiving circuit 12A may at the same time select and keep a record of a third channel A1 having the second lowest utilization rate or the second least interference as the reserve primary transmission channel. In another embodiment, the first RF transceiving circuit 12A may be designed to determine the reserve primary transmission channel by performing another idle channel search after the above data transmission begins. For example, the first RF transceiving circuit 12A may perform the idle channel search multiple times and change a previously selected reserve primary channel according to subsequent idle channel search results.

Furthermore, the first and second infrared transceiving circuits 12B and 14B are designed to communicate via a secondary channel such as a second channel (e.g., 38.4 KHz). In practice, the first channel A0, the third channel A1 and the second channel B may be free and open-source channels. The second channel B may be close to the first channel A0. For example, the first channel A0 and the second channel B are both within the frequency modulation band of 70 MHz to 100 MHz, with the first channel A0 at 70 MHz and the second channel B at 80 MHz. Whereas, the second channel B may also be far from the first channel A0. For example, the first channel is at 70 MHz of a frequency modulation band and the second channel B is at 2.402 GHz in the ISM band.

After selecting the third channel A1 as the reserve primary transmission channel, the first communication terminal 12 transmits information of the reserve primary transmission channel A1 via the primary channel A0 by the first RF transceiving circuit 12A, or transmits the information of the reserve primary transmission channel A1 via the secondary channel B by the first infrared transceiving circuit 14A to the second infrared transceiving circuit 14B.

During the data transmission between the first and second RF transceiving circuits 12A and 14A, the first communication terminal 12 may periodically or randomly detect a communication quality of the primary transmission channel A0. The first communication terminal 12 continues to transmit data via the first channel A0 when the communication quality of the first channel A0 is maintained at an ideal condition. Conversely, once the first communication terminal 12 discovers that the first channel A0 is degraded due to noise interference or overcrowding such that a signal-to-noise ratio (SNR) becomes lower than a predetermined value, e.g., 6 dB, the first communication terminal 12 sends a replacement request via the secondary channel B by the first infrared transceiving circuit 12B to the second infrared transceiving circuit 14B, so as to notify the second communication terminal 14 to replace the first channel A0 with the reserve primary channel, such as the third channel A1, to be the primary transmission channel. The first and second RF transceiving circuits 12A and 14A then switch to the third channel A1 to continue the data transmission.

Similarly, the first RF transceiving circuit 12A may then perform another idle channel search to determine a next reserve primary transmission channel, e.g., a fourth channel A2, as a reserve channel for the third channel A1. More specifically, when the communication quality of the third channel A1 is degraded, the first and second RF transceiving circuits 12A and 14A may again switch to the fourth channel A2 as the primary transmission channel to continue the data transmission. The steps of channel quality detection and channel replacement may be iterated until the data transmission between the first and second RF transceiving circuits 12A and 14A is completed.

In practice, supposing a time division multiplexing technique is adopted in the first RF transceiving circuit 12A, the channel quality detection may be performed during a free time slot of data transmission by the first RF transceiving circuit 12A. In practice, the idle channel search and the channel quality detection may also be performed by a dedicated channel quality detection circuit individually disposed at the first communication terminal 12.

As described above, the first communication terminal 12 and the second communication terminal 14 do not select a specific channel for data transmission in advance. Different from the conventional frequency hopping technique that switches channels after a fixed interval in a fixed sequence, the wireless transmission system 100 according to an embodiment of the present invention dynamically selects a communication channel according to a current channel quality, in a way that an interval of channel switching is adaptive rather than fixed. Therefore, even when interference is continuously present in one or more channels among available channels, the wireless communication system 100 is able to select a channel of a better communication quality and less interference for data transmission rather than being limited to predetermined channels. As a result, the wireless communication system 100 of the present invention offers a better communication quality compared to solutions associated with the conventional frequency hopping technique.

In addition, in the abovementioned embodiment, the channel replacement notification is transmitted via the secondary channel B by the first infrared transceiving circuit 12B and the second infrared transceiving circuit 14B. In this way, the ongoing data transmission between the first RF transceiving circuit 12A and the second RF transceiving circuits 14A is not interrupted for negotiating or communicating the replacement request. With the cooperation of the two sets of transceiving circuits, the wireless transmission system 100 of the present invention is capable of realizing seamless data transmission. In other words, the wireless communication system 100 utilizes one channel for wirelessly transmitting necessary pre-preparatory operations for data transmission of another channel, so that the data transmission via the latter channel directly enters frequency hopping without performing most of the pre-preparatory operations in advance to achieve high quality communication.

Furthermore, when the primary transmission channel A0 is subjected to interference leading to an unsatisfactory communication quality, transmitting the replacement request via the secondary channel B ensures that the replacement request is not omitted or missed due to the transmission interference. It is to be noted that, besides negotiating or communicating the replacement request, the first infrared transceiving circuit 12B and the second infrared transceiving circuit 14B may also be utilized for transmitting other commands or information.

The wireless communication system of the present invention is not limited to comprising two communication terminals. For example, the first communication terminal 12 may perform data transmission with a plurality of second communication terminals 14, and achieve high quality communication in each data transmission.

Figure 3:
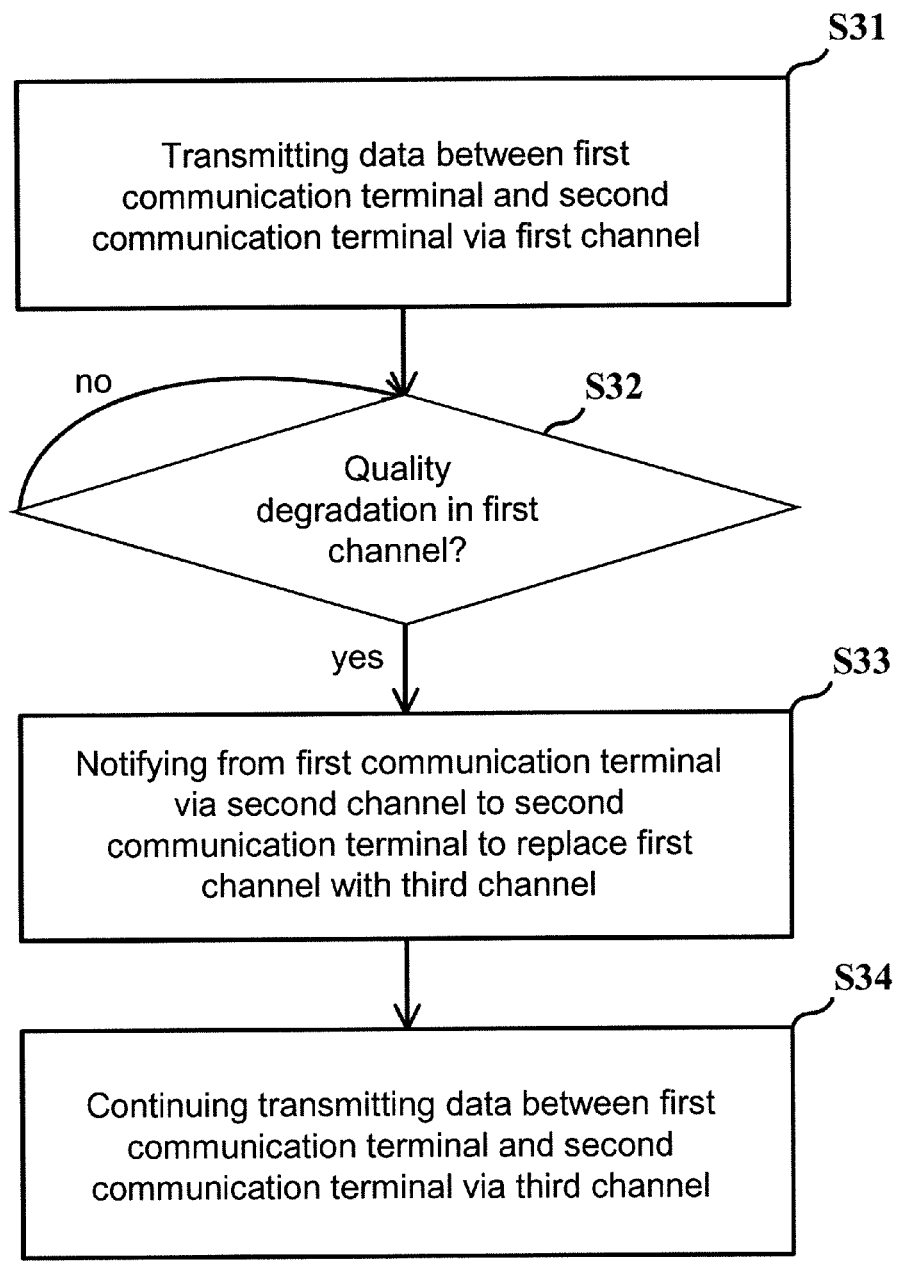
FIG. 3 is a flowchart of a wireless transmission method according to an embodiment of the present invention.

According to another embodiment of the present invention, a method of wireless transmission between a first communication terminal and a second communication terminal is provided. FIG. 3 shows a flowchart of a method of wireless transmission according to an embodiment of the present invention. In Step S31, a first channel is selected as a primary transmission channel for data transmission between the first communication terminal and the second communication terminal. During the data transmission, Step S32 is periodically or randomly performed to monitor whether a quality degradation is present in a default primary transmission channel. When a result from Step S32 is negative, Step S32 is again performed. Conversely, when the result from Step S32 is affirmative, Step S33 is performed to send a replacement request via a second channel as a secondary channel from the first communication terminal to notify the second communication terminal to replace the first channel by a third channel as the primary transmission channel. In Step S34, the data transmission between the first communication terminal and the second communication terminal is continued via the third channel.

The method illustrated in FIG. 3 is applicable to the wireless transmission system in FIG. 1 or any other two communication terminals requiring data transmission. Details of the application of the method are as previous descriptions with reference to FIG. 1, and are omitted herein.

Figure 4:
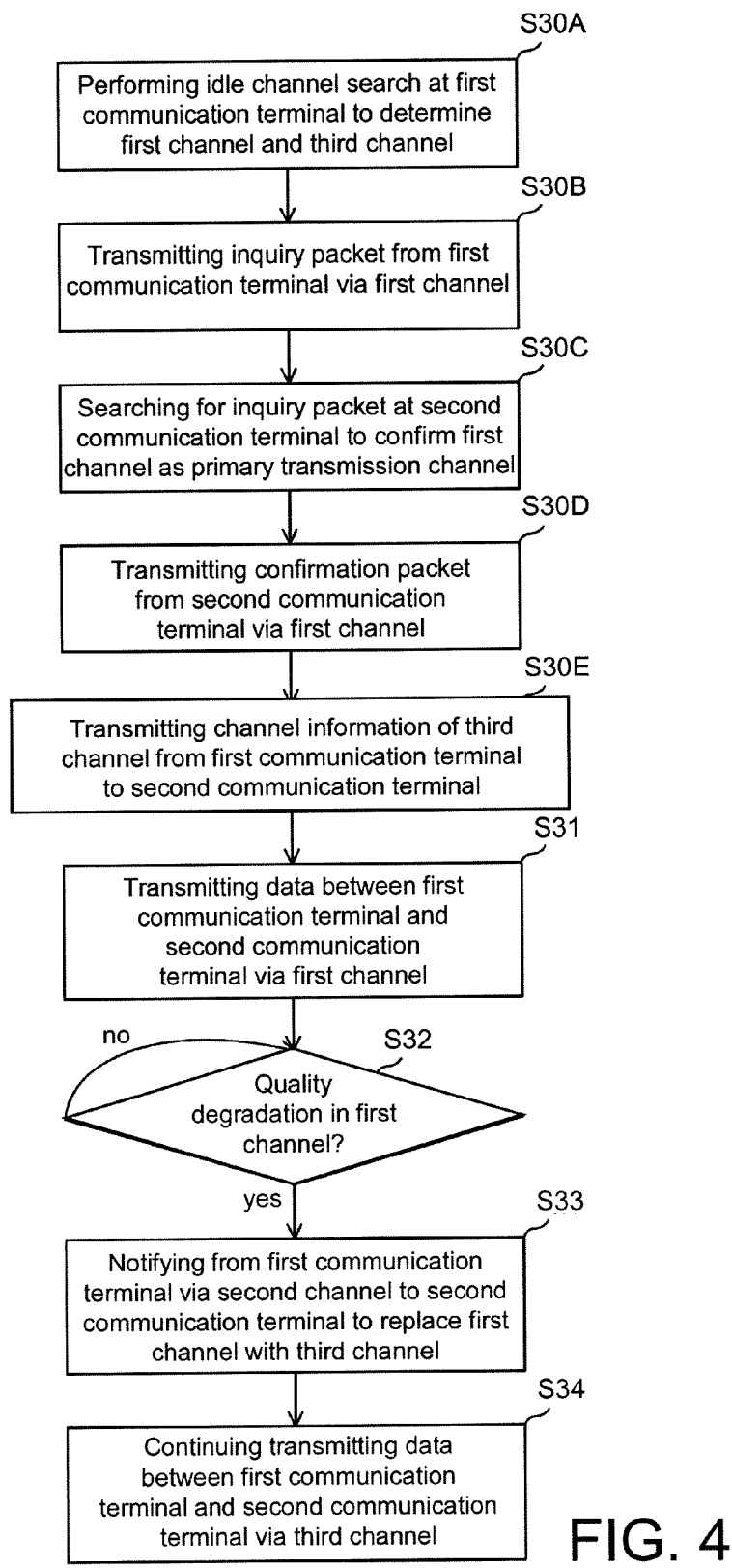
FIG. 4 is a flowchart of a wireless transmission method according to another embodiment of the present invention.

FIG. 4 shows a flowchart of detailed steps that can be further included before Step S31 in the method of wireless communication of the present invention. In Step 30A, an idle channel search is performed by the first communication terminal to determine the first channel as the primary transmission channel and the third channel as a reserve primary transmission channel. In Step S30B, an inquiry packet is transmitted from the second communication terminal via the first channel to confirm the first channel as the primary transmission channel. In Step S30D, a confirmation packet is transmitted from the second communication terminal via the first channel. In Step S30E, channel information of the third channel is transmitted from the first communication terminal to the second communication terminal. The subsequent Steps S31 to S34 are described above.

In practice, the determination of the primary transmission channel in Step S30A and Step S30E may also be performed after Step S31. Furthermore, the transmission of the channel information of the reserve primary transmission channel in Step S30E may be performed via either the primary transmission channel or a secondary channel.

Figure 5:
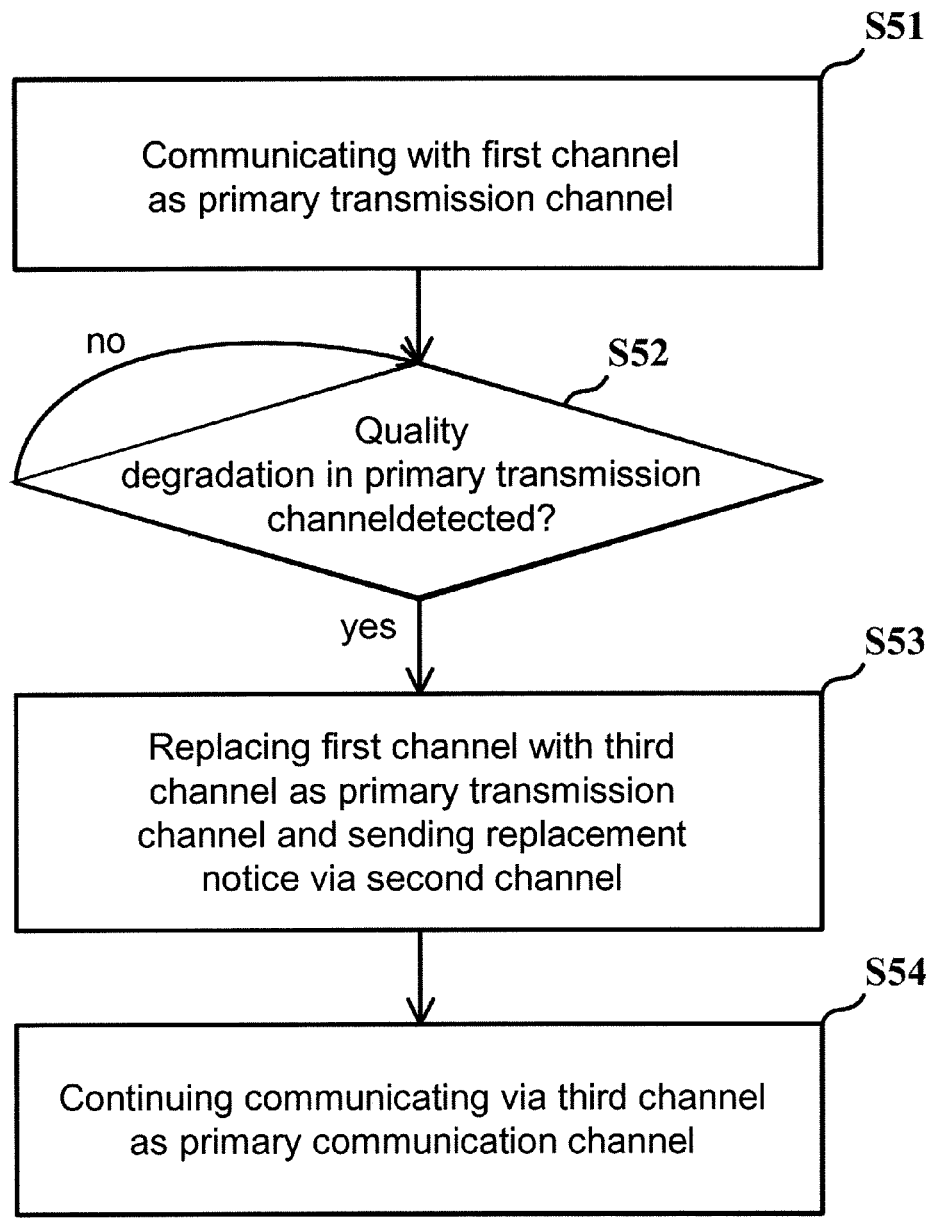
FIG. 5 is a flowchart of steps performed by a first communication terminal according to an embodiment of the present invention.

FIG. 5 shows a flowchart of steps performed by the first communication terminal according to an embodiment of the present invention. In Step S51, a first channel is selected by a first communication terminal as a primary transmission channel to communicate with a second communication terminal. In Step S52, a communication quality of the primary transmission channel is detected. When a determination result in Step S52 is negative, Step S52 is performed again. When the result from Step S52 is affirmative, Step S53 is performed. In Step S53, the first channel is replaced with a third channel as the primary transmission channel, and the first communication terminal sends a replacement request via a second channel to notify the second communication system to replace the first channel with the third channel as the primary transmission channel. In Step S34, the first communication terminal continues to communicate with the second communication terminal via the third channel as the primary transmission channel. The flowchart in FIG. 5 is applicable to the first communication terminal 12 in FIG. 1, and application details are as previously illustrated with reference to FIG. 1 and are omitted herein.

Therefore, with the cooperation between two wireless communication channels, the method and system of the present invention provide smart frequency hopping to offer an optimized transmission quality as well as realizing seamless data transmission. Compared to a system associated with the conventional frequency hopping technique, the wireless transmission system and method of the present invention offer a better transmission quality.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless transmission method, applied in transmission between a first communication terminal and a second communication terminal, comprising:
   a) the first communication terminal communicating via a first channel selected as a primary transmission channel;
   b) detecting a communication quality of the primary transmission channel, replacing the first channel with a third channel as the primary transmission channel when a quality degradation in the primary transmission channel is present, and the first communication terminal sending a replacement request via a second channel;
   c) the first communication terminal continuing communicating via the third channel as the primary transmission channel; and
   wherein after replacing the primary transmission channel, the first communication terminal or the second communication terminal is further configured to detect the communication quality, and when the quality degradation is present in the primary transmission channel, a first secondary transmission circuit replaces the third channel with a fourth channel as the primary transmission channel and transmits the replacement request via the second channel to a second secondary transmission circuit.

2. The method according to claim 1, before the step (a), further comprising:
   the first communication terminal performing an idle channel search to determine the first channel, the first channel having a lowest utilization rate or least interference among a plurality of available channels.

3. The method according to claim 2, after determining the primary transmission channel, further comprising:
   the first communication terminal transmitting an inquiry packet via the primary transmission channel;
   the second communication terminal searching for the inquiry packet to confirm the primary transmission channel; and
   the second communication terminal transmitting a confirmation packet via the primary transmission channel to the first communication terminal.

4. The method according to claim 2, wherein the idle channel search may also be utilized for determining the third channel, with the third channel having a second lowest utilization rate and second least interference.

5. The method according to claim 1, wherein the quality degradation comprises noise interference and overcrowding in the primary transmission channel such that a signal-to-noise ratio (SNR) is lower than a predetermined value.

6. The method according to claim 1, between the step (a) and the step (b), further comprising:
   performing an idle channel search to determine the third channel, the third channel having a second lowest utilization rate or second least interference among a plurality of available channels excluding the first channel.

7. The method according to claim 1, in between the step (a) and the step (b), further comprising:
   the first communication terminal transmitting channel information of the third channel to the second communication terminal via the primary transmission channel or via the second channel.

8. The method according to claim 1, wherein the first channel, the second channel and the third channel are open-source channels.

9. The method according to claim 1, further comprising iterating the step (b) after the step (c) until transmission ends.

10. The method according to claim 1, wherein the primary transmission channel corresponds to a primary transmission circuit, and information about the third channel is transmitted from the first communication terminal to the second communication terminal.

11. A wireless communication system, comprising:
    a first communication terminal, comprising a primary transmission circuit and a secondary transmission circuit; and
    a second communication terminal, comprising a second primary transmission circuit corresponding to a first primary transmission circuit and a second secondary transmission circuit corresponding to a first secondary transmission circuit;
    wherein, the first primary transmission circuit utilizes a first channel as a primary transmission channel for data transmission with the second primary transmission circuit; and when a quality degradation is present in the primary transmission channel, the first secondary transmission circuit is configured to send a replacement request via a second channel to the second secondary transmission circuit to notify the second communication terminal to replace the first channel with a third channel as the primary transmission channel; and
    wherein after replacing the primary transmission channel, the first communication terminal or the second communication terminal is further configured to detect a communication quality, and when the quality degradation is present in the primary transmission channel, the first secondary transmission circuit replaces the third channel with a fourth channel as the primary transmission channel and transmits the replacement request via the second channel to the second secondary transmission circuit.

12. The wireless communication system according to claim 11, wherein the first communication terminal is further configured to perform an idle channel search before the data transmission to determine the first channel, with the first channel having a lowest utilizing rate or least interference among a plurality of available channels.

13. The wireless communication system according to claim 12, wherein the first communication terminal is further configured to determine the third channel while determining the first channel, with the third channel having a second lowest utilization rate or second least interference among a plurality of available channels.

14. The wireless communication system according to claim 11, wherein the first communication terminal is configured to perform an idle channel search after the data transmission begins to determine the third channel, with the third channel having a second lowest utilization rate and second least interference among a plurality of available channels excluding the first channel.

15. The wireless communication system according to claim 11, wherein the first primary transmission circuit is further configured to transmit channel information of the third channel to the second primary transmission circuit via the primary transmission channel , or via the second channel.

16. The wireless communication system according to claim 11, wherein the first channel, the second channel and the third channel are open-source channels.

\* \* \* \* \*